United States Patent
Herr

(10) Patent No.: US 12,519,371 B2
(45) Date of Patent: Jan. 6, 2026

(54) HAND-HELD POWER TOOL COMPRISING A SENSOR CIRCUIT BOARD

(71) Applicant: Robert Bosch GmbH, Stuttgart (DE)

(72) Inventor: Tobias Herr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 17/753,557

(22) PCT Filed: Sep. 4, 2020

(86) PCT No.: PCT/EP2020/074817
§ 371 (c)(1),
(2) Date: Mar. 8, 2022

(87) PCT Pub. No.: WO2021/048025
PCT Pub. Date: Mar. 18, 2021

(65) Prior Publication Data
US 2022/0337122 A1    Oct. 20, 2022

(30) Foreign Application Priority Data

Sep. 11, 2019  (DE) .................... 10 2019 213 790.3
Aug. 21, 2020  (DE) .................... 10 2020 210 674.6

(51) Int. Cl.
*H02K 7/14*     (2006.01)
*B25B 21/02*    (2006.01)
(Continued)

(52) U.S. Cl.
CPC ............. *H02K 7/145* (2013.01); *B25F 5/008* (2013.01); *H02K 11/215* (2016.01); *B25B 21/02* (2013.01)

(58) Field of Classification Search
None
See application file for complete search history.

(56) References Cited

U.S. PATENT DOCUMENTS 9,048,699 B2 *   6/2015  Oomori ................. H05K 1/181
2006/0213333 A1 * 9/2006  Kageler ................ H01H 9/06
                                                        81/436
(Continued)

FOREIGN PATENT DOCUMENTS

CN    102015215 A    4/2011
CN    104416187 A    3/2015
(Continued)

OTHER PUBLICATIONS

International Search Report corresponding to International Patent Application No. PCT/EP2020/074817, mailed Nov. 20, 2020 (6 pages).

*Primary Examiner* — Tanzim Imam
(74) *Attorney, Agent, or Firm* — Maginot, Moore & Beck LLP

(57) ABSTRACT

A hand-held power tool includes a tool receptacle, a housing, in which at least one electronically commutated drive motor is arranged for driving an insertion tool that can be arranged in the tool receptacle, and a sensor circuit board arranged in the housing and on which sensor elements are arranged for allowing sensor-controlled commutation of the electronically commutated drive motor. The power tool further includes at least one mounting element for mounting the sensor circuit board in the housing and for arranging the sensor circuit board on the electronically commutated drive motor. The sensor circuit board is mechanically decoupled from the electronically commutated drive motor.

18 Claims, 4 Drawing Sheets

(51) Int. Cl.
*B25F 5/00* (2006.01)
*H02K 11/215* (2016.01)

(56) References Cited

U.S. PATENT DOCUMENTS

| | | |
|---|---|---|
| 2010/0283332 A1 | 11/2010 | Toukairin et al. |
| 2011/0227430 A1 | 9/2011 | Omori et al. |
| 2015/0333600 A1 | 11/2015 | Nakano et al. |
| 2017/0106490 A1 | 4/2017 | Privett, Jr. et al. |
| 2017/0274520 A1 | 9/2017 | Christophersen et al. |

FOREIGN PATENT DOCUMENTS

| | | | |
|---|---|---|---|
| CN | 207256163 U | | 4/2018 |
| DE | 103 45 136 A1 | | 4/2005 |
| DE | 10 2013 219 729 A1 | | 3/2015 |
| EP | 2 359 986 A2 | | 8/2011 |
| EP | 3 632 626 A1 | | 4/2020 |
| JP | 2010-99823 A | | 5/2010 |
| JP | 2010-260152 A | | 11/2010 |
| JP | 2011-104671 A | | 6/2011 |
| JP | 2015-9316 A | | 1/2015 |
| JP | 2015009316 A | * | 1/2015 |
| JP | 2016-221631 A | | 12/2016 |
| JP | 2017-13141 A | | 1/2017 |
| JP | 2018-137843 A | | 8/2018 |
| JP | 2018-171685 A | | 11/2018 |
| JP | 2018-202500 A | | 12/2018 |
| WO | 2018/220942 A1 | | 12/2018 |

* cited by examiner

HAND-HELD POWER TOOL COMPRISING A SENSOR CIRCUIT BOARD

This application is a 35 U.S.C. § 371 National Stage Application of PCT/EP2020/074817, filed on Sep. 4, 2020, which claims the benefit of priority to Serial Nos. DE 10 2019 213 790.3, filed on Sep. 11, 2019, and DE 10 2020 210 674.6, filed on Aug. 21, 2020, both filed in Germany, the disclosures of all of which are incorporated herein by reference in their entirety.

BACKGROUND

The present disclosure relates to a hand-held power tool comprising a tool holder and a housing in which at least one electronically commutated drive motor for driving an insertion tool which can be arranged in the tool holder is arranged, and comprising a sensor circuit board which is arranged in the housing and on which sensor elements are arranged in order to render possible sensor-controlled commutation of the electronically commutated drive motor.

A hand-held power tool of this kind which is in the form of a screwdriver and has, in a housing, an electronically commutated drive motor for driving an insertion tool which can be arranged in the tool holder is known from the prior art. The electronically commutated drive motor is commutated in a sensor-controlled manner, wherein a sensor circuit board with sensor elements, preferably Hall sensors, is provided for this purpose. The sensor circuit board is mechanically arranged on or fastened to the electronically commutated drive motor.

SUMMARY

The present disclosure relates to a hand-held power tool comprising a tool holder and a housing in which at least one electronically commutated drive motor for driving an insertion tool which can be arranged in the tool holder is arranged, and comprising a sensor circuit board which is arranged in the housing and on which sensor elements are arranged in order to render possible sensor-controlled commutation of the electronically commutated drive motor. At least one mounting element is provided for mounting the sensor circuit board in the housing and for arranging the sensor circuit board on the electronically commutated drive motor, wherein the sensor circuit board is mechanically decoupled from the electronically commutated drive motor.

The disclosed arrangement therefore renders possible the provision of a hand-held power tool in which a simplified and stable arrangement of the sensor circuit board in the housing of the hand-held power tool can be rendered possible by the at least one mounting element. Furthermore, a compact arrangement of the drive motor and the sensor circuit board can be rendered possible by the at least one mounting element.

In one refinement of the at least one mounting element, the at least one mounting element has a receptacle for accommodating the sensor circuit board at least in sections.

The at least one mounting element is preferably arranged on the housing. Therefore, the mechanical decoupling from the drive motor can be rendered possible in a simple way.

As an alternative or in addition, the at least one mounting element is arranged on the sensor circuit board. A receptacle, which accommodates the mounting element, is provided in the housing for mounting the mounting element in the housing of the hand-held power tool.

In one embodiment, the at least one mounting element is fastened to the sensor circuit board by injection-molding.

Therefore, a secure and robust arrangement of the at least one mounting element can be rendered possible.

According to one embodiment, a fan is arranged in the housing, wherein the fan is positioned at an end, facing the tool holder, of the electronically commutated drive motor. Therefore, cooling of the hand-held power tool, for example of the transmission and/or of the percussion mechanism, can be rendered possible in an easy and uncomplicated manner.

According to an alternative embodiment, a fan is arranged in the housing, wherein the fan is positioned at an end, facing away from the tool holder, of the electronically commutated drive motor. Therefore, cooling of the hand-held power tool, for example the drive motor, can be rendered possible in an easy and uncomplicated manner.

The sensor circuit board is preferably arranged between the fan and the electronically commutated drive motor. Therefore, suitable wiring and/or cooling can be rendered possible in a simple manner. In this case, the sensor circuit board and the fan can be positioned at an end, facing away from the tool holder, of the electronically commutated drive motor. In this case, an armature bearing for mounting the drive shaft can be positioned such that the sensor circuit board is arranged between the armature bearing and the fan at an end, facing away from the tool holder, of the electronically commutated drive motor. As an alternative, the sensor circuit board and the fan can be positioned at an end, facing the tool holder, of the electronically commutated drive motor here.

The sensor circuit board preferably has a U-shaped main body. Within the meaning of the present disclosure, a U-shaped main body is also understood to mean open shapes of main bodies which differ from the U shape, for example a C-shaped, an arcuate or a semicircular main body. Therefore, easy and uncomplicated mounting of the sensor circuit board can be rendered possible, wherein mounting of the sensor circuit board can follow mounting of the drive motor.

As an alternative, the sensor circuit board has a circular main body. Within the meaning of the present disclosure, a circular main body is also understood to mean closed shapes of main bodies which differ from the circular shape, for example an oval or elliptical main body. A circular main body provides, for example, a greater surface area for accommodating sensors and other electronic components on the sensor circuit board.

According to a further embodiment, the sensor circuit board is positioned at an end, facing away from the tool holder, of the electronically commutated drive motor. In this case, the fan can be positioned at an end, facing the tool holder, of the electronically commutated drive motor. An armature bearing for mounting the drive shaft can be positioned such that the sensor circuit board is arranged between the armature bearing and an end, facing away from the tool holder, of the electronically commutated drive motor. Therefore, a further suitable arrangement of the sensor circuit board can be rendered possible in a simple and uncomplicated manner.

The sensor elements preferably have Hall sensors. Therefore, reliable and cost-effective sensor elements can be provided.

The sensor circuit board is preferably electrically connected to an electronics unit which is associated with the electronically commutated drive motor. Therefore, a sensor circuit board can be provided which is simple to mount since a plug connection for connection to the electronics unit can be dispensed with.

A power supply unit, which is preferably in the form of a rechargeable battery pack, for supplying power to the electronically commutated drive motor is provided. Therefore, a suitable power supply can be provided in a simple manner.

According to one embodiment, the hand-held power tool is in the form of an impact screwdriver. Therefore, a suitable hand-held power tool for use with the sensor circuit board can be provided in a simple and uncomplicated manner.

BRIEF DESCRIPTION OF THE DRAWINGS

The disclosure is explained in more detail in the following description on the basis of exemplary embodiments illustrated in the drawings, in which.

DETAILED DESCRIPTION

Figure 1:
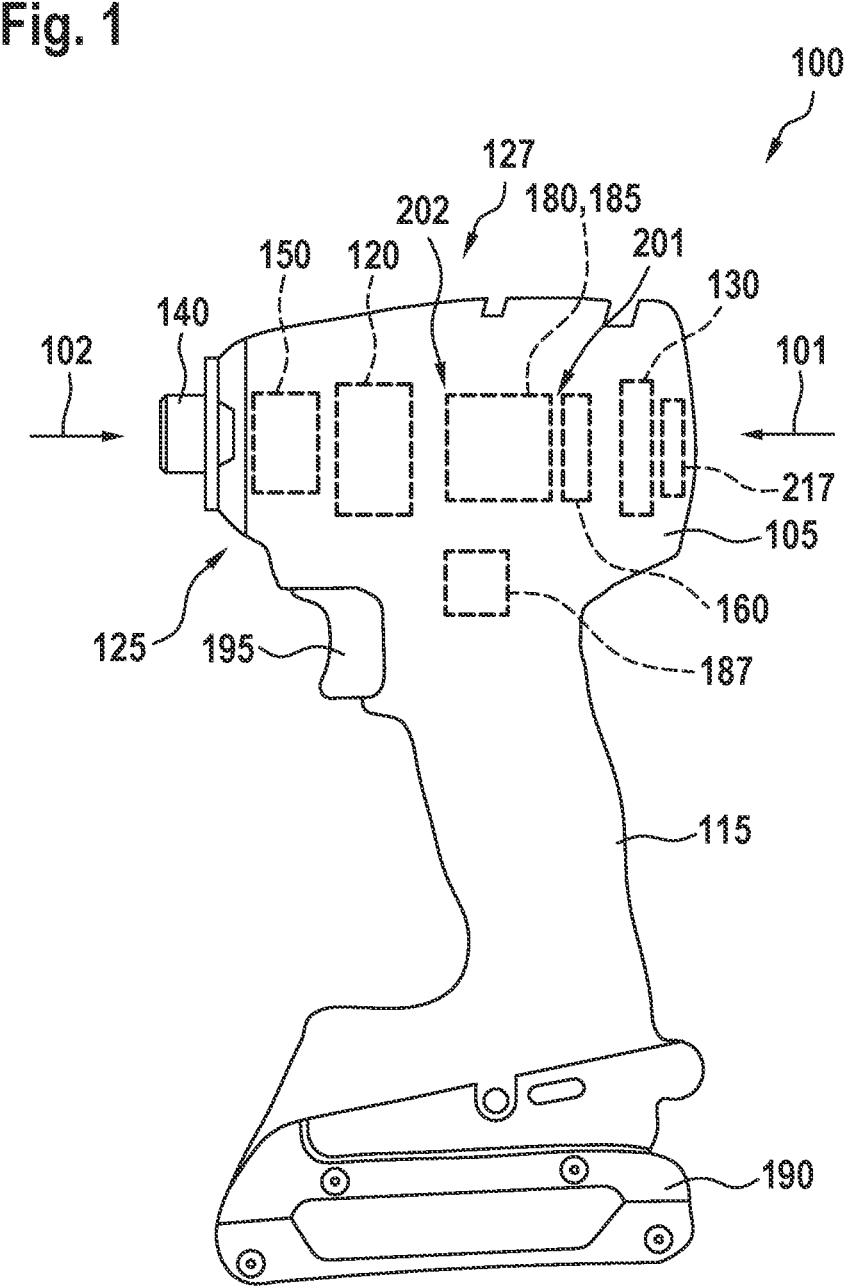
FIG. 1 shows a side view of a hand-held power tool according to the disclosure.

FIG. 1 shows an exemplary hand-held power tool 100 which has a housing 105 with a handle 115. According to one embodiment, the hand-held power tool 100 can be mechanically and electrically connected to a power supply unit 190 for mains power-independent power supply.

A drive unit 127 with a first axial end 101 and an opposite second axial end 102 is preferably arranged in the housing 105. The drive unit 127 has at least one transmission unit 125 and one electric drive motor 180.

The power supply unit 190 is preferably provided for supplying power to the drive motor 180 of the hand-held power tool 100. The power supply unit 190 is preferably in the form of a rechargeable battery pack. As an alternative or in addition to this, the hand-held power tool 100 can also be operable in dependence on mains power.

The drive motor 180 is preferably in the form of an electronically commutated drive motor 185. For this purpose, a sensor circuit board 160 with sensor elements (252 in FIG. 2) is associated with the drive motor 180 for sensor-controlled commutation. The sensor circuit board 160 is preferably mechanically decoupled from the electronically commutated drive motor 185. The drive motor 180 or a drive shaft 215 (FIG. 2) of the drive motor 180 is mounted in the housing 105 by means of an armature bearing 217.

The drive motor 180 can be switched on and off by means of a manual switch 195, for example. Furthermore, a tool holder 140 for holding an insertion tool, for example a screwdriver bit, drill etc., is associated with the hand-held power tool 100 at the second axial end 102. The drive motor 180 is preferably designed to drive the tool holder 140 and therefore the insertion tool.

The transmission unit 125 is preferably arranged facing the second axial end 102 and the drive motor 180 is arranged facing the first axial end 101. At least one transmission 120 is preferably associated with the transmission unit 125.

By way of example, the hand-held power tool 100 is in the form of an impact screwdriver with a percussion mechanism 150. The percussion mechanism 150 is associated with the transmission unit 125. It should be noted that the disclosed arrangement is not limited to impact screwdrivers, but rather can also be used in different hand-held power tools with and without a percussion mechanism 150 which have a sensor-controlled drive motor, for example in cordless drill/drivers.

Figure 2:
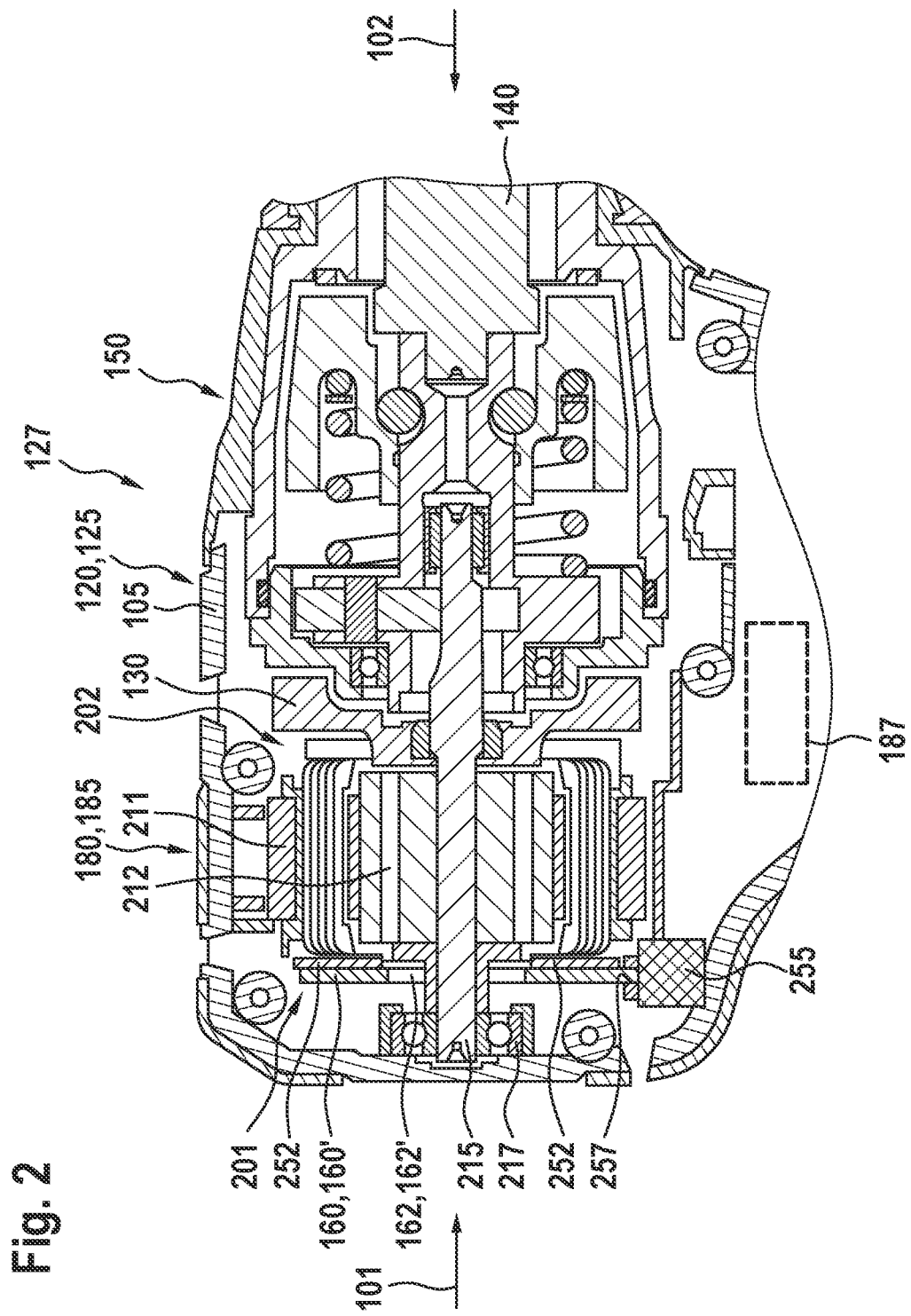
FIG. 2 shows a partial longitudinal section through the hand-held power tool from FIG. 1, for illustrating an arrangement of a sensor circuit board associated with the hand-held power tool.
Figure 4:
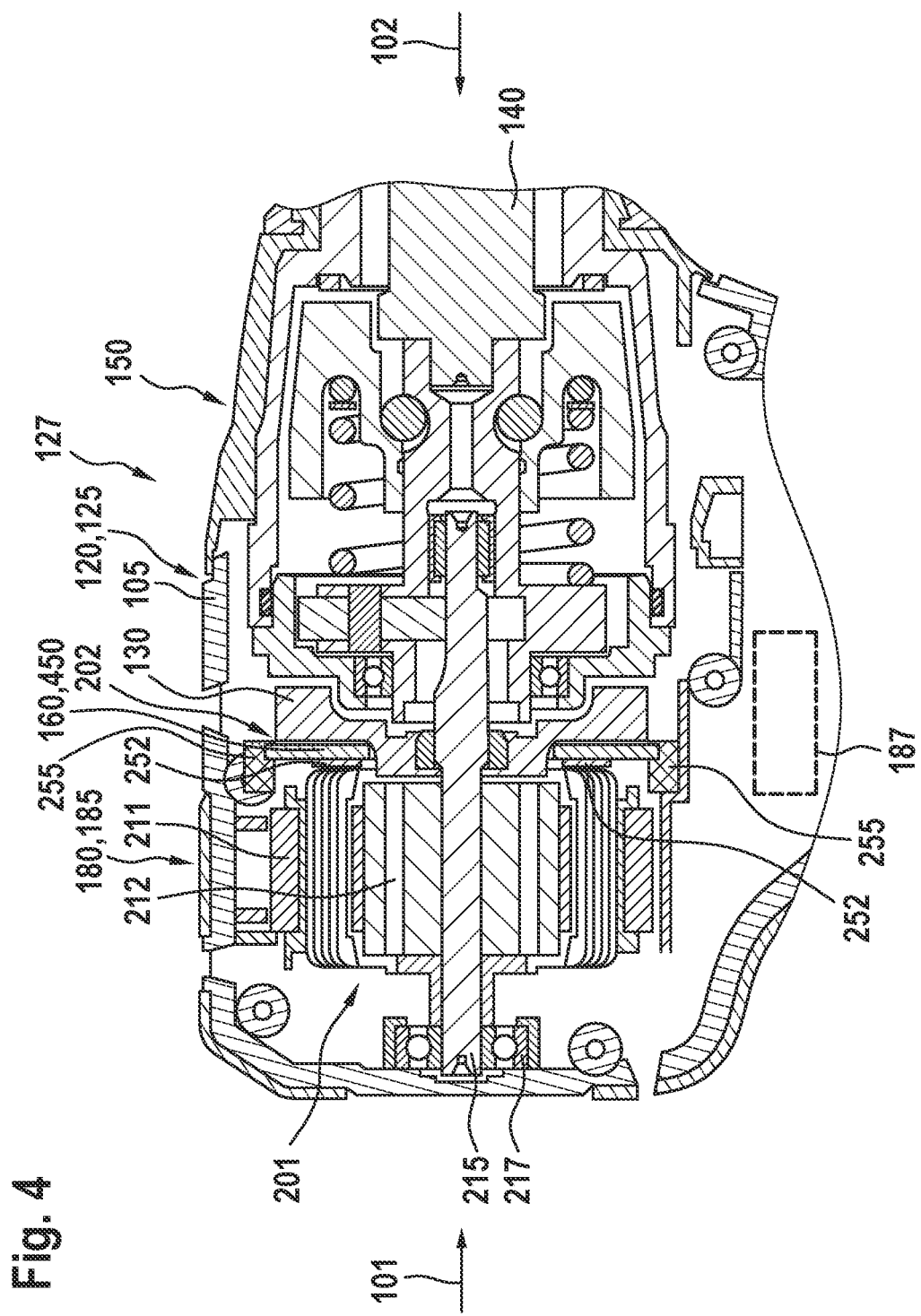
FIG. 4 shows a partial section through the hand-held power tool from FIG. 1, for illustrating a further arrangement of a sensor circuit board associated with the hand-held power tool.

Furthermore, a fan 130 is preferably provided. For the purpose of illustration and by way of example, the fan 130 is positioned at the first axial end 101 or at an end 201, facing away from the tool holder 140, of the electronically commutated drive motor 185. However, the fan 130 can also be arranged on any desired point in the housing 105. The fan 130 can be arranged, for example, at an end 202, facing the tool holder 140 or the second axial end 102, of the electronically commutated drive motor 185, for example as shown in FIG. 2 and FIG. 4. The sensor circuit board 160 is preferably arranged between the fan 130 and the drive motor 180, as shown in FIG. 1 and FIG. 4. However, the hand-held power tool 100 can also be formed without a fan 130.

In addition, the hand-held power tool 100 has an electronics unit 187. The electronics unit 187 is preferably associated with the drive motor 180. According to one embodiment, the electronics unit 187 is preferably in the form of a main electronics system to which signals of the drive motor 180 and the sensor circuit board 160 are sent. The sensor circuit board 160 is preferably electrically connected to the electronics unit 187, wherein an electrical connection can be formed via soldered-on lines and/or a plug connection.

FIG. 2 shows the drive unit 127 from FIG. 1 comprising the drive motor 180, the transmission unit 125 and the sensor circuit board 160. In this case, FIG. 2 clearly shows the drive motor 180 which is in the form of an electronically commutated drive motor 185, is mounted in the housing 105 by means of a drive shaft 215 and has a stator 211 and a rotor 212. In the embodiment illustrated, the drive shaft 215 is mounted in the housing 105 in the region of the first axial end 101 with the aid of an armature bearing 217. The armature bearing 217 is positioned at an end 201, facing away from the tool holder 140, of the electronically commutated drive motor 185.

As an alternative or in addition, the drive shaft 215 can also be mounted in a transmission flange associated with the transmission unit 125. Electronically commutated drive motors 185 of this kind are sufficiently known from the prior art and a detailed description has been dispensed with here for this reason.

In FIG. 2, the fan 130 is arranged, by way of example, on the side facing the second axial end 102 or the output side of the drive motor 180 and of the transmission unit 125. The fan 130 is positioned at an end 202, facing the tool holder 140, of the electronically commutated drive motor 185. However, the fan 130 can also be arranged on a side, facing the first axial end 101 of the drive unit 127, of the drive motor 180, as schematically illustrated in FIG. 1. In this case, the fan 130 is preferably arranged or mounted on the drive shaft 215.

In FIG. 2, the sensor circuit board 160 is positioned at an end 201, facing away from the tool holder 140, of the electronically commutated drive motor 185. The sensor circuit board 160 is positioned between the armature bearing 217 and the electronically commutated drive motor 185 at an end 201, facing away from the tool holder 140, of the electronically commutated drive motor 185. At least one mounting element 255 is preferably provided for mounting the sensor circuit board 160 in the housing 105 and for arranging the sensor circuit board 160 on the electronically commutated drive motor 185. The at least one mounting element 255 is preferably in the form of an intermediate element between the housing 105 and the sensor circuit board 160.

For illustration purposes, the at least one mounting element 255 is arranged on a housing shell or on housing half-shells which form the housing 105. However, it should be noted that the housing 105 can also have a cover, preferably at the first axial end 101 or at the illustrated left-hand end in FIG. 2. This cover can preferably be fixed to the housing half-shells, for example, by means of a clamping and/or screw connection. In this case, the drive shaft 215 with the rotor 212 can likewise be connected to the cover or mounted on it. According to a further embodiment, the sensor circuit board 160 can be arranged on the cover by means of the at least one mounting element 255 and in this way mounted in the housing 105.

The sensor circuit board 160 is mechanically decoupled from the electronically commutated drive motor 185, that is to say the sensor circuit board 160 is not axially fastened to the stator 211 of the drive motor 185 as in the prior art, but rather is mechanically fastened in the housing 105 independently of said drive motor. In this case, the sensor circuit board 160 is mechanically decoupled from the drive motor 185, in particular the stator 211, but is positioned on the stator 211.

It should be noted that, by way of the mechanical decoupling of the sensor circuit board 160 from the drive motor 180, the drive motor 180 can also be operated without the sensor circuit board 160, that is to say can be operated as a drive motor commutated without sensors. Furthermore, a drive motor commutated without sensors can be retrofitted with the sensor circuit board 160 electronically decoupled from the drive motor and can be in the form of a sensor-controlled commutated drive motor. Furthermore, replacement of the sensor circuit board 160, for example in the event of a defect in a sensor element 252, is simplified by the decoupling.

According to one embodiment, the at least one mounting element 255 is fastened to the housing 105. The at least one mounting element 255 preferably has a receptacle 257 for accommodating the sensor circuit board 160 at least in sections. Point mounting or surface mounting is preferably formed.

Figure 3:
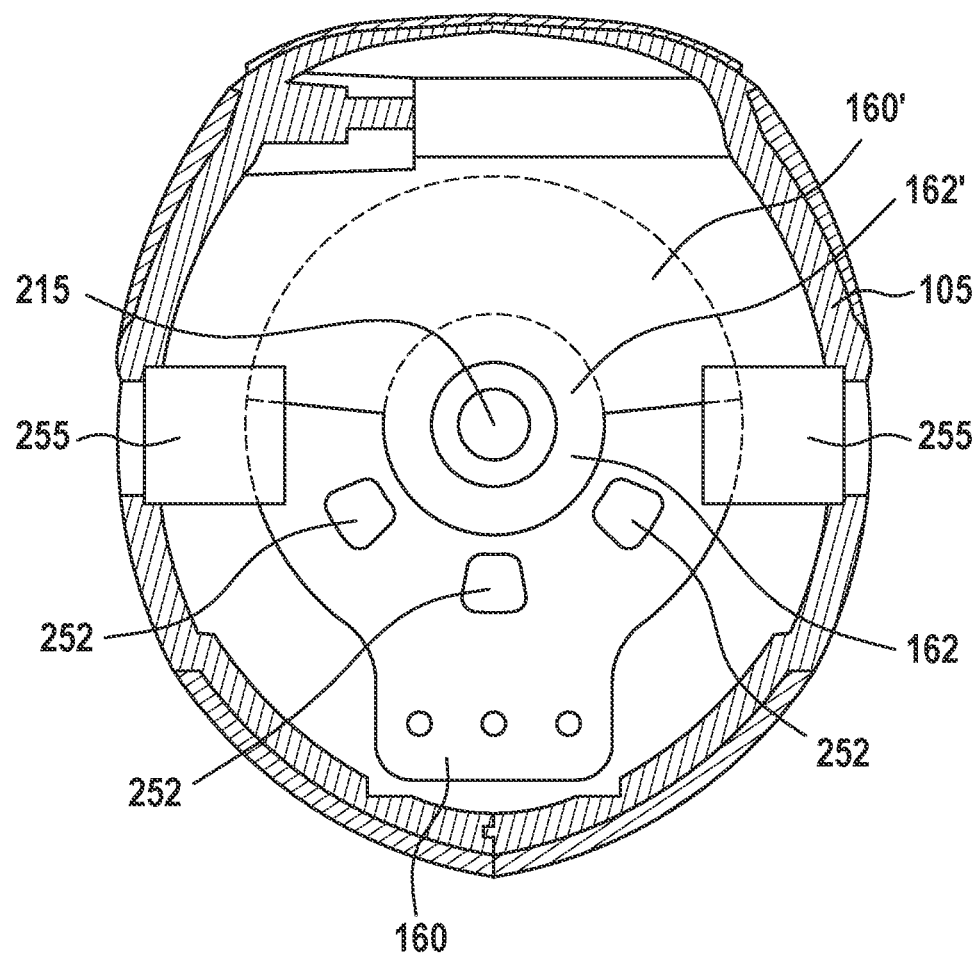
FIG. 3 shows a plan view of the sensor circuit board arranged in a housing of the hand-held power tool as viewed from a second axial end of the hand-held power tool.

The sensor circuit board 160 can preferably be positioned in the housing 105 by means of a mounting element 255 with a mounting point, wherein what is known as single-point or single-surface mounting is preferably formed. Furthermore, two-point or two-surface mounting, as shown in FIG. 3 for example, or mounting with more than two points or surfaces, for example three-point mounting, three-surface mounting, four-point mounting or four-surface mounting etc. can also be provided. Furthermore, the mounting element 255 can also be formed in a C-shape, wherein the sensor element 160 is mounted in the housing 105 by means of a prespecified region, and wherein a tongue-and-groove connection is formed, for example, between the mounting element 255 and the sensor circuit board 160.

Here, the mounting element 255 is securely fastened in the interior of the housing 105, for example by way of a non-positive connection, a positive connection and/or a cohesive connection. Furthermore, the mounting element 255 can also be formed in one piece with the housing 105.

According to an alternative arrangement, the at least one mounting element 255 is fastened to or molded onto the sensor circuit board 160 by injection-molding. This can be performed, for example, by way of mutually associated shapes as in the case of a plug and/or a coupling. In this case, the at least one mounting element 255 has a receptacle for arrangement, for example, on a housing web of the housing 105. However, the at least one mounting element 255 can also be fastened to the housing 105 by means of a releasable connection, for example a clamping and/or screw connection. The housing 105 can also have a receptacle (not illustrated) in which the mounting element 255 of the sensor circuit board 160 is accommodated.

The sensor elements 252 preferably have Hall sensors. Furthermore, the sensor elements 252 can also have further elements. In addition, the sensor elements 252 can also be in the form of Hall sensors. In this case, the sensor elements 252 are mechanically and electrically connected, for example soldered and/or connected by means of a plug connection, to the sensor circuit board 160.

The Hall sensors are designed to detect a rotor position associated with the rotor 212. As a result, an existing rotation speed can be ascertained. Depending on the ascertained rotation speed, the drive motor 180 can then be driven in turn.

FIG. 3 shows an arrangement of the sensor circuit board 160 from FIG. 2 in the housing 105 of the hand-held power tool 100 from FIG. 1 and illustrates, by way of example, two preferably diametrically opposite mounting elements 255. It should be noted that at least one mounting element 255 is provided. In this case, the number of mounting elements 255 is not limited and therefore any desired number of mounting elements 255 can be provided.

The at least one mounting element 255 is arranged on the housing 105. The mounting element 255 can be formed in one piece with the housing 105. The mounting element 255 can also be designed as a separate mounting element which is fastened to the housing 105. The mounting element 255 can be formed in the manner of a rail. In addition, the mounting element 255 can be formed in accordance with a tongue/groove element, wherein the mounting element 255 forms the groove element or the tongue element and the housing 105 and/or the sensor circuit board 160 forms the tongue element or the groove element. In this case, the mounting element 255 can preferably have a tongue or groove element on its side facing the housing 105 and a groove or tongue element on its side facing the sensor circuit board 160. However, the mounting element 255 can also be formed on the housing 105, for example, in one piece with the housing or can be fastened to said housing by means of a fastening element and have a groove or tongue element on its side facing the sensor element 160.

According to one alternative or optional embodiment, the mounting element 255 can be formed in a U-shape. Furthermore, the mounting element 255 can be formed in the manner of a plug or a plug socket. As an alternative or as an option, the mounting element 255 can be formed in the manner of a coupling, wherein the mounting element 255 has a coupling geometry and the housing 105 and/or the sensor circuit board 160 has a coupling geometry associated with first-said coupling geometry.

FIG. 3 shows the sensor circuit board 160 in a U-shaped refinement using solid lines. In addition, an alternative refinement of a circular sensor circuit board 160' is shown using dashed lines in FIG. 3. The sensor circuit board 160 has a recess 162 in which the drive shaft 215 is arranged. The recess 162 is approximately semicircular in the embodiment illustrated. The drive shaft 215 is arranged in the recess 162 at least in sections. The U-shaped sensor circuit board 160 surrounds the drive shaft 215 in sections. The alternative refinement of the circular sensor circuit board 160' likewise has a recess 162' in which the drive shaft 215 is arranged. The recess 162' is substantially circular in the embodiment illustrated. The drive shaft 215 is arranged in the recess 162'. The drive shaft 215 engages through the recess 162' in the sensor circuit board 160'. The sensor circuit board 160' surrounds the drive shaft 215. As an alternative, the recesses 162, 162' can also assume a different geometric shape which is suitable for receiving the drive shaft 215.

FIG. 4 shows the drive unit 127 from FIG. 1 and FIG. 2, comprising the drive motor 180, the transmission unit 125 and the sensor circuit board 160, wherein the sensor circuit board 160 is arranged between the drive motor 180 and the fan 130 according to an alternative arrangement. Here, the fan 130 and the sensor circuit board 160 are positioned at an end 202, facing the tool holder 140, of the electronically commutated drive motor 185. In addition, FIG. 4 illustrates the sensor circuit board 160 which preferably has a U-shaped main body 450.

However, the sensor circuit board 160 can also have a main body shaped in any other desired manner, for example a C-shaped or I-shaped main body. Furthermore, the sensor circuit board 160 can also be formed from two or more parts. Here, for example, two I-shaped main bodies can form the sensor circuit board 160. In general, the sensor circuit board 160 is formed in such a way that it can be arranged or positioned in the region of the stator 211 after the drive unit 127 is mounted.

The invention claimed is:

1. A hand-held power tool comprising:
   a tool holder configured to receive an insertion tool;
   a housing;
   at least one electronically commutated drive motor that is configured to drive the insertion tool and is arranged in the housing;
   a sensor circuit board that is arranged in the housing and on which sensor elements are arranged to enable sensor-controlled commutation of the at least one electronically commutated drive motor; and
   at least one mounting element configured for mounting the sensor circuit board in the housing and for arranging the sensor circuit board on the at least one electronically commutated drive motor,
   wherein the sensor circuit board is mechanically decoupled from the at least one electronically commutated drive motor.

2. The hand-held power tool as claimed in claim 1, wherein the at least one mounting element has a receptacle that accommodates at least sections of the sensor circuit board.

3. The hand-held power tool as claimed in claim 1, wherein the at least one mounting element is arranged on the housing.

4. The hand-held power tool as claimed in claim 1, wherein the at least one mounting element is arranged on the sensor circuit board.

5. The hand-held power tool as claimed in claim 4, wherein the at least one mounting element is fastened to the sensor circuit board by injection-molding.

6. The hand-held power tool as claimed in claim 1, further comprising a fan arranged in the housing at a first end of the at least one electronically commutated drive motor that faces toward the tool holder.

7. The hand-held power tool as claimed in claim 1, further comprising a fan arranged in the housing at an end of the at least one electronically commutated drive motor facing away from the tool holder.

8. The hand-held power tool as claimed in claim 1, further comprising a fan arranged in the housing, wherein the sensor circuit board is arranged between the fan and the at least one electronically commutated drive motor.

9. The hand-held power tool as claimed in claim 6, wherein the sensor circuit board is positioned at a second end of the at least one electronically commutated drive motor that faces away from the tool holder.

10. The hand-held power tool as claimed in claim 1, wherein the sensor circuit board has a U-shaped main body.

11. The hand-held power tool as claimed in claim 1, wherein the sensor circuit board has a circular main body.

12. The hand-held power tool as claimed in claim 1, wherein the sensor elements include Hall sensors.

13. The hand-held power tool as claimed in claim 1, wherein the sensor circuit board is electrically connected to an electronics unit which is associated with the at least one electronically commutated drive motor.

14. The hand-held power tool as claimed in claim 1, further comprising a power supply unit configured to supply power to the at least one electronically commutated drive motor.

15. The hand-held power tool as claimed in claim 1, wherein the hand-held power tool is an impact screwdriver.

16. The hand-held power tool as claimed in claim 14, wherein the power supply unit includes a rechargeable battery pack.

17. The hand-held power tool as claimed in claim 1, further comprising:
   a fan,
   wherein
   the fan is mounted on a shaft on which a rotor of the at least one electronically commutated drive motor is mounted, and
   at least a portion of the sensor circuit board is mounted by the at least one mounting element at a location between the rotor and the fan.

18. The hand-held power tool as claimed in claim 17, wherein the sensor circuit board is coaxial with the shaft.

* * * * *